United States Patent

Lindblom

[15] 3,667,619

[45] June 6, 1972

[54] STEM FEED ARRANGEMENT

[72] Inventor: Thore Lindblom, Alfta, Sweden

[73] Assignee: Ostbergs Fabriks AB, Alfta, Sweden

[22] Filed: Aug. 7, 1970

[21] Appl. No.: 62,087

[30] Foreign Application Priority Data

Nov. 28, 1969 Sweden..................................16399

[52] U.S. Cl. ........................................................214/1 PB
[51] Int. Cl.........................................................B65g 61/00
[58] Field of Search...........................................214/1, 1 PB

[56] References Cited

UNITED STATES PATENTS

| 3,306,472 | 2/1967 | Blanz | 214/1 PB |
| 3,182,816 | 5/1965 | Illo | 214/1 PB |

FOREIGN PATENTS OR APPLICATIONS

| 982,606 | 2/1965 | Great Britain | 214/1 PB |
| 156,469 | 3/1964 | U.S.S.R. | 214/1 PB |

Primary Examiner—Robert G. Sheridan
Assistant Examiner—Frank E. Werner
Attorney—Pierce, Scheffler and Parker

[57] ABSTRACT

Felled trees were heretofore fed by a crane one by one to a working unit. This method implied poor utilization of the crane capacity. At the invention the upper part of an inclined sliding chute serves as a buffer space for trees into which a crane can load the entire tree bundle and during the intervals carry out other useful work. The buffer store of trees rests against the inside of the longer arm of an unequally armed angular lever, which with its corner is mounted at the sliding chute. By turning upwardly the shorter arm of the angular lever the tree located closest is taken along and by a full turn of the lever lifted over to the lower part of the chute on which it slides down to the unit. Thereafter the lever is swung into the opposite direction back to its original position for repeating the batching operation.

1 Claims, 1 Drawing Figure

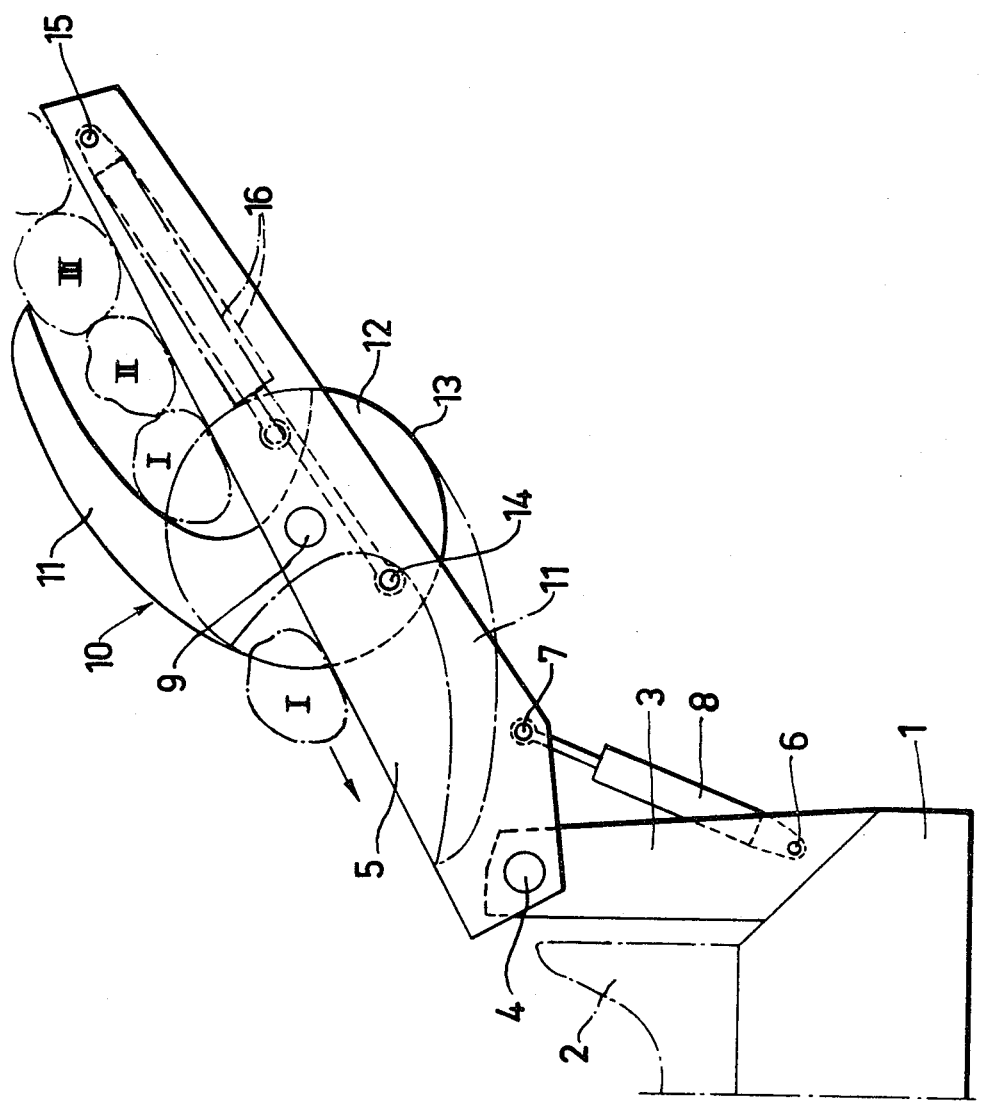

STEM FEED ARRANGEMENT

This invention relates to a stem feed arrangement adapted for use with a tree working unit, for example an upwardly opening trimming unit.

Certain units for the working, for example trimming, of trees can be opened upwardly for receiving the wood from above. For placing the wood into the unit usually a loading crane is used which catches a felled tree at its lower stem part, drags it to the unit and lifts the stem part on its place in the unit. When a greater number of trees are felled within the unit. When a greater number of trees are felled within the felling area, this method apparently implies a complicated work and poor utilization of the crane capacity. If, moreover, the capacity of the unit is such high that the crane cannot deliver trees in step with their working, which especially can be the case when the felled trees lie widely spread in the area, also the capacity of the unit is poorly utilized. In both cases there is a substantial waste of time.

These shortcomings are reduced to a high degree by the stem feed arrangement according to the invention which is characterized in that it comprises a sliding chute downwardly inclined to the unit and an unequally armed angular lever, which adjacent the angle corner is mounted about a horizontal shaft at the chute and by a mechanism, for example a hydraulic means, adapted to be swung into a first direction so as between its longer arm and the upper surface of the sliding chute to form a buffer space for the storage of several stems loaded from the upper end of the sliding chute, and thereafter to be swung into the opposite direction so as by its shorter arm to lift at least one of the stored stems, and subsequent to a full turn to cause this stem to slide downwards along the chute to the unit, whereafter the swinging operations are repeated for reducing by batches the buffer store.

The invention is described in greater detail in the following, with reference to the accompanying drawing showing a schematic side view of a stem feed arrangement according to the invention.

From a foundation 1 for a working unit indicated only symbolically at 2 (shown in open state) an upright 3 projects upwardly to the side of the unit. About a shaft 4, in its upper portion, one end of a sliding chute 5 designed as a frame structure is pivotally mounted. Between a point 6 on the upright and a point 7 on the sliding chute there acts a hydraulic means 8 which via feed lines and controls (not shown) can be operated for adjusting the inclination of the chute.

About a horizontal shaft 9, closer to the center of the sliding chute and somewhat below its upper surface, an unequally armed angular lever, generally designated by 10, is mounted in the vicinity of its angle corner. The longer arm 11 as well as the shorter arm 12 have slightly concave inside contours, which in the angle corner softly transform into one another. The outside contour 13 of the shorter arm 12 follows a circular arc having the shaft 9 as its center and softly joins the outside contour of the longer arm 11, thereby giving the angular lever 10 an appearance resembling a lobster's claw. Between a point 14 on the rear portion of the claw 10 and a point 15 close to the upper end of the sliding chute 5 a further hydraulic means 16 is inserted by which (via lines and controls) the claw can be pivoted about the shaft 9.

In the embodiment shown the sliding chute is assumed to be assembled of two parallel side plates (one being visible in the Figure) having plane upper edges for defining the sliding surface proper. The plates are held together by distance members (not shown), which provide space for the claw mounted between the plates to be pivoted into the positions described below. The hydraulic means are also mounted between the side plates of the chute.

The arrangement described above operates as follows.

During the transport of the unit to the working place, the chute 5 preferably is held folded up vertically by the hydraulic means 8 so as to hinder as little as possible the driving of the carrier vehicle on-road and off-road. Upon arrival at the working place the chute 5 is lowered by the means 8 to such a degree of inclination which is suitable with respect to the friction conditions expected. These friction conditions depend on the temperature and season. Frozen or sapping wood slides relatively easily.

The claw 10 is swung by the hydraulic means 16 into the position indicated in the Figure by fully drawn lines. By assistance of a loading means, for example a crane available on the working place, a number of felled trees are lifted with their stem ends onto the upper portion of the chute 5 and allowed to slide along the chute into the buffer space defined between the longer arm 11 of the claw and the upper surface of the chute. The trees preferably are placed in parallel and so that the tree tops resting on the ground have the same direction. A number of stored stems are indicated by dash-dotted lines, and the three first stems are designated by I, II and III.

As the next stop, the claw 10 is caused to swing counterclockwise in the Figure by the means 16. Hereby, as can be seen from the Figure, the shorter arm 12 of the claw lifts by its inside the stem I and takes it along in its rotation to deliver it onto the lower portion of the chute, so that the stem I can continue to slide down to the unit 2 as indicated in the Figure. If demanded, the speed of the stem to the unit can be reduced by braking the stem by lifting the point of the longer claw arm 11 above the sliding surface of the chute. The end position of the claw is marked by dashed-dotted lines. Owing to the arc-shaped contour of the rear claw portion, the following stem II is retained in that position which it had assumed when the stem I was lifted.

Thereafter the claw is swung clockwise without obstruction by the stem II (because of said arc contour), and when the end edge of the arm 12 passes the upper surface of the chute the stem II softly slides into the space now being free, followed by the stem III, and so on. If the stem (tree) I just then is being trimmed or subject to some other working, during which it is moved longitudinally, there may be a risk that the stem II, and thereby also the stem III, are displaced from their position in the buffer space, because the tops of the stems I, II and III resting on the ground may engage with each other. This risk can be eliminated by still more swinging the claw 10 clockwise and thereby clamping at least one of the stems resting on the chute. After completed working of the stem I the swinging cycle described is repeated.

It appears from the above that it is possible to "tap" trees from a buffer store of trees by batches, the store being filled intermittently by a loading means, which during the intervals can be utilized for some other wood handling work. The arrangement, furthermore, eliminates waste time for the working unit. This unit advantageously may be of the type adapted to handle a single thick tree or two thinner trees simultaneously. Hereby, the short arm 12 of the claw can be utilized at maximum with respect to its length.

The invention is not restricted to the embodiment shown but different modifications may be made within the scope of the invention, particularly with respect to the design of the claw (angular lever). Not only the configuration of the claw may be changed, but also, for example, the longer arm 11 may be articulated in one or several places for obtaining greatest possible connection to the stems in the buffer space. For controlling the curvature of the arm, a hydraulic means or a linkage may be used. It is apparent as well that the two described hydraulic means can be placed in a way other than shown or be replaced by other operation mechanisms.

What I claim is:

1. A transportable stem feed arrangement for a tree working unit, such as an upwardly opening trimming unit, which comprises a sliding chute downwardly inclined to the unit, and an unequally armed angular lever, which adjacent the angle corner is mounted about a horizontal shaft at the chute and by a hydraulic mechanism adapted to be swung into a first direction so as to form, between its longer arm and the upper surface of the sliding chute, a buffer space for the storage of several stems loaded from the upper end of the sliding chute and thereafter to be swung into the opposite direction so as by its shorter arm to lift at least one of the stems stored and subsequent to a full turn to allow this (these) stem(s) to slide downwards along the chute to the unit, whereafter the swinging operations are repeated for reducing by batches the buffer store, said chute at its lower end being pivotally mounted in a support placed adjacent the unit, and adjustable with respect to its inclination by a mechanism, for example a hydraulic means, acting between the support and the chute.

\* \* \* \* \*